United States Patent
Steeves (10) Patent No.: US 12,231,166 B2
(45) Date of Patent: Feb. 18, 2025

(54) HYBRID DISTRIBUTED UNIT CELLULAR NETWORK ARCHITECTURE

(71) Applicant: DISH Wireless L.L.C., Littleton, CO (US)

(72) Inventor: Daniel Steeves, Lakewood, CO (US)

(73) Assignee: DISH Wireless L.L.C., Littleton, CO (US)

( * ) Notice: Subject to any disclaimer, the term of this patent is extended or adjusted under 35 U.S.C. 154(b) by 344 days.

(21) Appl. No.: 17/715,773

(22) Filed: Apr. 7, 2022

(65) Prior Publication Data
US 2023/0327763 A1     Oct. 12, 2023

(51) Int. Cl.
*H04B 10/2575*     (2013.01)
*H04W 16/00*     (2009.01)

(52) U.S. Cl.
CPC ...... *H04B 10/25752* (2013.01); *H04W 16/00* (2013.01)

(58) Field of Classification Search
CPC ............ H04B 10/25752; H04W 16/00; H04W 24/02; H04W 88/085
See application file for complete search history.

(56) References Cited

U.S. PATENT DOCUMENTS

| 2017/0134927 | A1* | 5/2017 | Lee | H04W 8/005 |
| 2018/0310199 | A1* | 10/2018 | Halabian | H04W 28/0289 |
| 2020/0162348 | A1 | 5/2020 | Suthar et al. | |
| 2021/0297925 | A1 | 9/2021 | Berzin et al. | |
| 2022/0060520 | A1 | 2/2022 | Carney Landow et al. | |
| 2022/0279421 | A1* | 9/2022 | Sivakumar | H04W 40/248 |
| 2023/0284053 | A1* | 9/2023 | Mehta | H04W 24/10 455/424 |

OTHER PUBLICATIONS

Jordan Eugina: "Open RAN functional splits, explained", Feb. 24, 2021 (Feb. 24, 2021), XP055961023, Internet Retrieved from the Internet: URL:https://www.5gtechnologyworld.com/open-ran-functional-splits-explained/ [retrieved on Sep. 14, 2022] p. 6, line 3-line 6 Figure 4, Figure 12.

\* cited by examiner

*Primary Examiner* — Kashif Siddiqui
(74) *Attorney, Agent, or Firm* — Kilpatrick Townsend & Stockton LLP (57) ABSTRACT

Various hybrid cellular network arrangements are presented herein. Multiple light base stations may be present, in each light base station of the plurality of light base stations, a radio unit and an antenna may be present, but not a distributed unit. A local data center can be present, which can include a distributed unit host server system. This system can be communicatively connected with each light base station of the plurality of light base stations. The distributed unit host server system of the local data center can host an instantiation of a distributed unit for each light 5G base station of the plurality of light base stations. The local data center can be geographically remote from the light 5G base stations.

15 Claims, 6 Drawing Sheets

HYBRID DISTRIBUTED UNIT CELLULAR NETWORK ARCHITECTURE

BACKGROUND

Cellular networks are complex and expensive to build. At a cellular base station (BS), in addition to an antenna and a structure to which the antenna is mounted, various other hardware may typically be present, such as a radio. At a BS in a 5G New Radio (NR) cellular network, a radio unit, which is connected with the antenna, is connected with a distributed unit (DU), which performs local processing on data transmitted and received.

In a high-density area, such as downtown in a major metropolis, BSs may need to be distributed close to each other to provide sufficient coverage. Embodiments detailed herein provide an architecture that allows for cellular network coverage in areas that need a high density of base stations.

SUMMARY

Various embodiments are described related to a cellular network. In some embodiments, a cellular network is described. The network may comprise a plurality of light 5G base stations. Each light 5G base station of the plurality of light 5G base stations may comprise a radio unit and an antenna. Each light 5G base station of the plurality of light 5G base stations may not include a distributed unit. The network may comprise a local data center, comprising a distributed unit host server system, that may be communicatively connected with each light 5G base station of the plurality of light 5G base stations. The distributed unit host server system of the local data center may host an instantiation of a distributed unit for each light 5G base station of the plurality of light 5G base stations. The local data center may be geographically remote from the plurality of light 5G base stations.

Embodiments of such a network may include one or more of the following features: each radio unit of the plurality of light 5G base stations may transmit a continuous bit rate data stream of received signals to the local data center. The network may further comprise a plurality of dedicated fiber optic links. Each dedicated fiber optic link may connect a different light 5G base station of the plurality of light 5G base stations with the local data center. The network may further comprise a full base station, comprising: a radio unit, and a distributed unit. The radio unit and the distributed unit may be located on site at the full base station. The network may further comprise a pass-through edge data center, comprising one or more routers. The pass-through edge data center may be communicatively connected with the full base station and the local data center that may be communicatively connected with the plurality of light 5G base stations. The full base station may communicate using multiprotocol label switching (MPLS) segment routing (SR) on a fiber-based network. The network may further comprise a centralized unit communicatively coupled with the pass-through edge data center. The centralized unit may be hosted on a cloud-computing platform. The centralized unit may be hosted on the cloud-computing platform as part of a breakout edge data center. The full base station may further comprise a router that routes communications between the radio unit, the distributed unit, and the pass-through edge data center.

In some embodiments, a method for creating a cellular network utilizing a hybrid distribution of distributed units (DUs) is described. The method may comprise installing a plurality of light base stations distributed in a geographic region. Each light base station of the plurality of light base stations may comprise a radio unit but may not include a DU. The plurality of light base stations may be part of a 5G New Radio (NR) cellular network. The method may comprise installing a local data center that hosts a plurality of DUs. Each DU of the plurality of DUs may correspond to a light base station of the plurality of lights base stations. The method may comprise connecting the RUs of the plurality of light base stations with the DUs of the local data center using dedicated communication links.

Embodiments of such a method may include one or more of the following features: installing a plurality of full base stations, where each full base station of the plurality of full base stations may comprise a radio unit and a DU. The method may further comprise installing a pass-through edge data center. The method may further comprise connecting the plurality of full base stations with the pass-through edge data center. Multiprotocol label switching (MPLS) segment routing (SR) may be used for communication between the pass-through edge data center and each full base station of the plurality of full base stations. The method may further comprise connecting the local data center with the pass-through edge data center. The method may further comprise providing cellular network service to a plurality of user equipment using the plurality of full base stations and the plurality of light base stations. The method may further comprise connecting the pass-through edge data center with a cloud computing platform on which the cellular network core may be executed. A centralized unit may be hosted by on the cloud-computing platform each of the plurality of DUs and the plurality of full base stations. The method may further comprise transmitting, by each radio unit of the plurality of light base stations, a continuous bit rate data stream of received signals to the local data center. A plurality of dedicated fiber optic links may be used to connect the RUs of the plurality of light base stations with the DUs of the local data center.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In certain geographic areas, such as downtown districts of a metropolis, a high-density of base stations (BSs) is needed to provide ample cellular network coverage, such as due to the density of users and the attenuation characteristics of buildings. On a 5G cellular network, a conventional BS has some form of structure on which one or more antennas are mounted. The antennas are connected to a radio unit (RU), which is connected to a distributed unit (DU) located on site.

Having all of such hardware and software located on-site may be an efficient architecture when average spacing is present between BSs, such as in suburban and rural regions. However, when an especially high density of BSs is needed, arrangements detailed herein may be more efficient, cost-effective, provide better coverage, and/or be easier to maintain.

As detailed herein, at some BSs of a 5G New Radio (NR) cellular network, which can be referred to as "light base stations," a DU is not present. Rather, the DU is located remotely at a local data center (LDC) at which multiple DUs are located. For a high-density cluster of light base stations, a significant number of DUs can be co-located at a single LDC, such as up to 30 DUs. Each of these DUs can have a fiber optic connection with a corresponding light BS such that the RU at the light BS and the corresponding DU at the LDC can communicate. Since, in a virtualized implementation of an open radio access network (O-RAN), at least some radio access network (RAN) components are special-purpose software running on general-purpose hardware platforms, a server system of the LDC can execute multiple instantiations of DUs such that the server system is hosting the DUs for multiple light BSs.

Embodiments detailed herein are focused on such light BSs, a cellular network architecture that incorporates light base stations and other forms of base stations, and how such an architecture can be integrated with components of the RAN and core cellular network that are hosted by a cloud-computing platform. Further detail regarding these and other embodiments are provided in relation to the figures.

Figure 1:
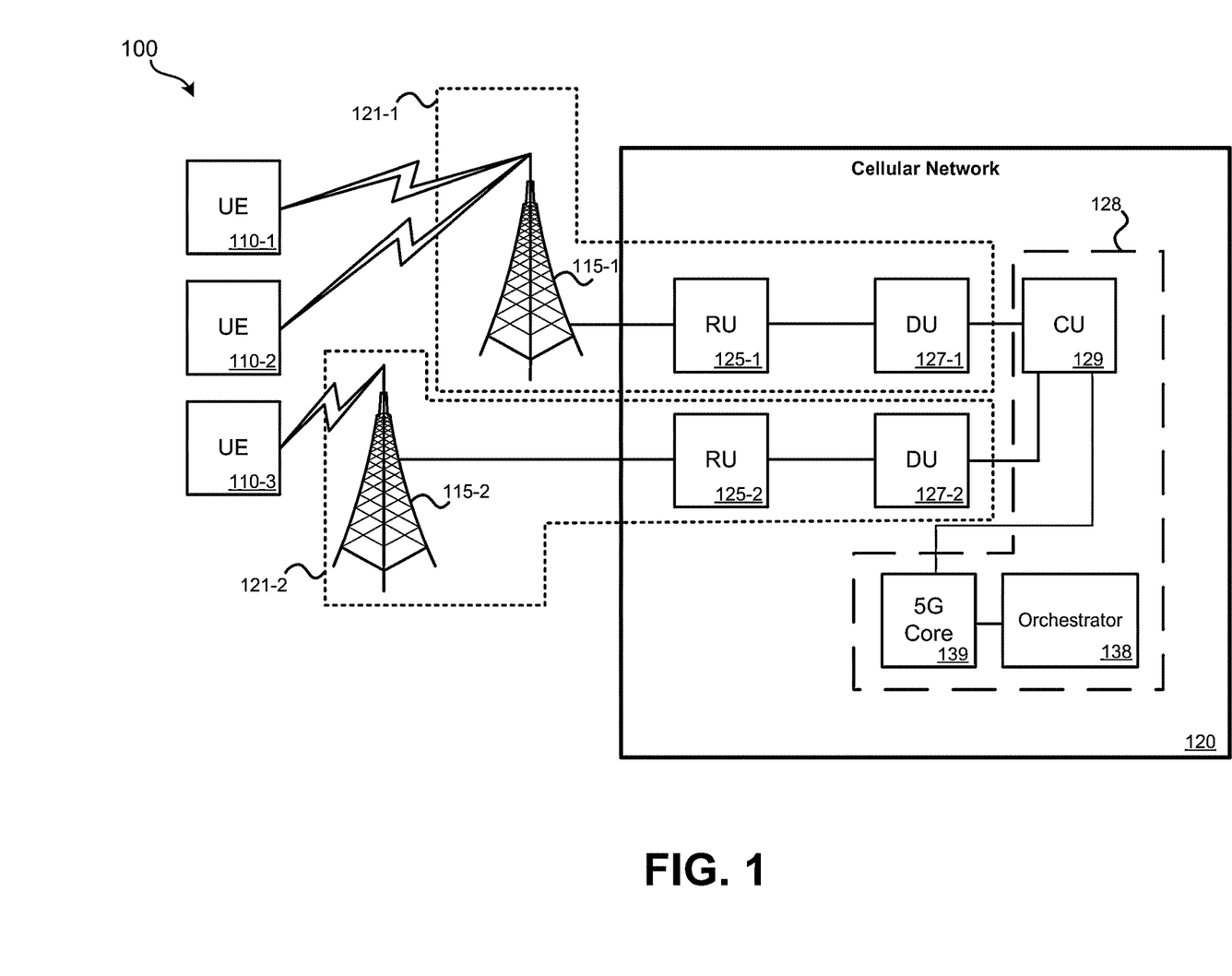
FIG. 1 illustrates an embodiment of a cellular network.

FIG. 1 illustrates an embodiment of a cellular network system 100 ("system 100"). FIG. 1 represents an embodiment of a cellular network which can accommodate the architecture of FIGS. 2-4. System 100 can include a 5G New Radio (NR) cellular network; other types of cellular networks, such as 6G, 76, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various base stations of cellular network 120. As illustrated, two base stations are illustrated: base station 121 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other man-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations and many CUs and 5G core 139. BS 121-1 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible 0-RAN implementation, DUs 127, CU 129, 5G core 139, and/or orchestrator 138 can be implemented virtually as software being executed by general-purpose computing equipment, such as in a data center, as detailed herein. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
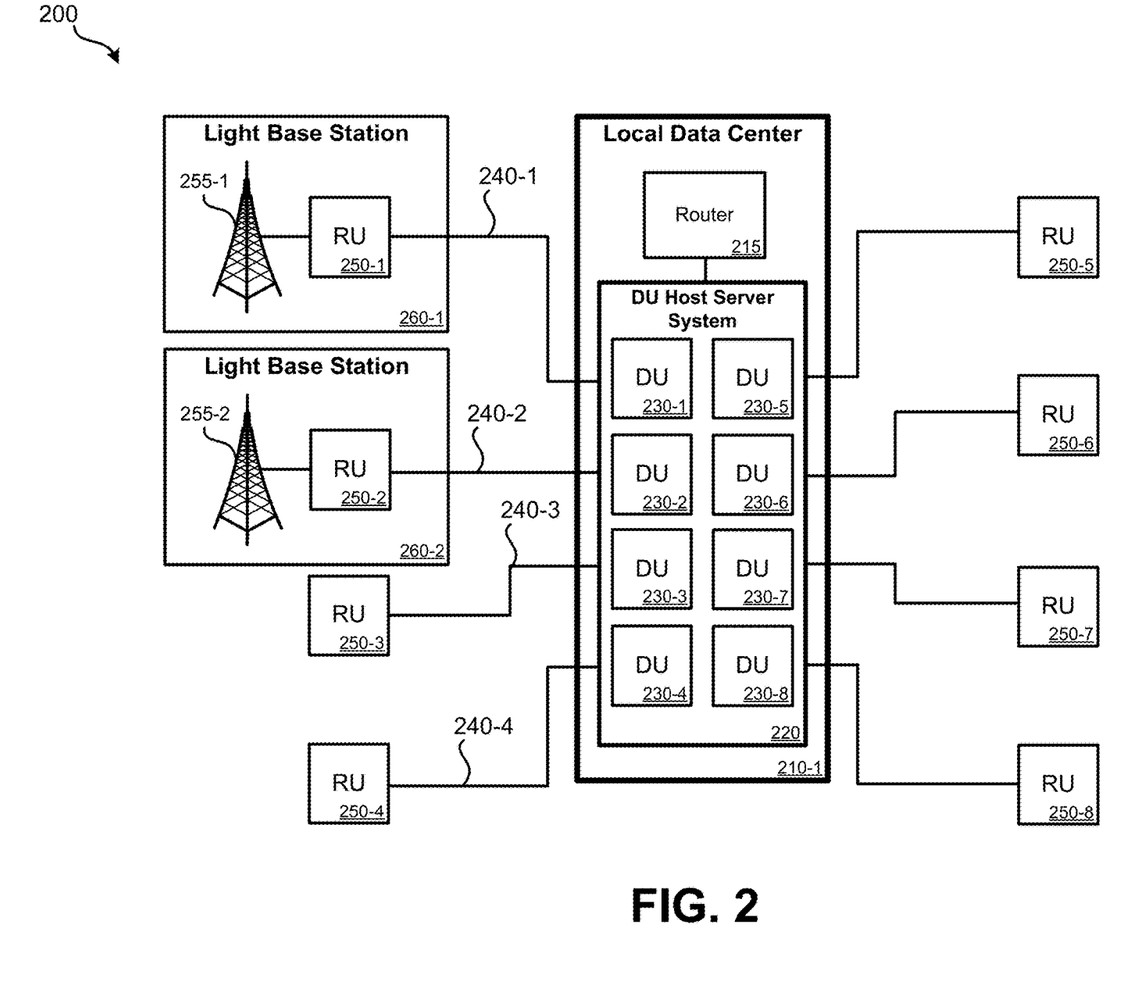
FIG. 2 illustrates an embodiment of a cellular network that includes a local data center that hosts multiple remote distributed units (DUs).

While FIG. 1 illustrates an embodiment of a 5G NR cellular network, the specific architecture of the cellular network may vary for particular geographic regions. FIG. 2 illustrates an embodiment of cellular network system 200 ("system 200") that includes a local data center that hosts multiple remote distributed units (DUs). System 200 can be incorporated in one or more geographic locations as part of system 100 of FIG. 1. For example, as detailed in relation to FIG. 5, system 200 may be particularly useful for providing cellular service in a high-density area, such as in the financial district of a major metropolis.

System 200 can include: local data center 210-1 ("LDC 210-1"); router 215; DU host server system 220; DUs 230; fiber optic connections 240; RUs 250; and light BSs 260. ABS being referred to as "light" within this document refers to no DU being physically present on-site at the light 5G NR BS, but rather the DU is physically remote at an LDC. Light base station 260-1 includes: RU 250-1, structure 255-1, and one or more antennas (not illustrated) that are electrically connected with RU 250-1. Typically, the one or more antennas and RU 250-1 are mounted to structure 255-1. In some embodiments, a router may also be present to route data traffic between RU 250-1 and LDC 210-1. Light base station 260-2 may be another base station, in a geographically different location from light base station 260-1 and is used to provide cellular service to a different geographic area than light base station 260-1.

RUs 250-3, 250-4, 250-5, 250-6, 250-7, and 250-8 are also part of light base stations, which are not illustrated for the simplicity of FIG. 2. While eight RUs 250 are illustrated (and thus represent eight light BSs), it should be understood that other embodiments of an LDC may communicate with fewer or greater numbers of RUs. For example, in some embodiments, up to or more DUs may be hosted by DU host server system 220.

Each of RUs 250 may be connected with LDC 210-1 via a fiber optic connection. In some embodiments, a dedicated fiber optic connection exists between an RU and LDC 210-1. In other embodiments, techniques such as wave-division multiplexing may be used that allow a fiber optic connection to be shared, but for a dedicated amount of bandwidth to be reserved between an RU and LDC 210-1.

Each of RUs 250 is essentially a radio that converts digital data from a corresponding DU to RF and RF to digital data for transmission to a corresponding DU. As such, RUs do not analyze the data included in any transmit or receive signal. When converting RF to digital data, the amount of data created is constant regardless of the number of UE and amount of data being sent by the UE to the RU. Therefore, for example, a constant bit rate signal is present from RU 250-1 to LDC 210-1 regardless of the number of UE communicating with RU 250-1. Based upon the data rate of this uplink signal from RU 250-1 to LDC 210-1, the uplink bandwidth of fiber optic connection 240-1 can be reserved. A similar connection is present for each light base station for RUs 250. Each of these light BSs provide coverage to at least a slightly different geographic region. Each RU of RUs 205, possibly via a router, is connected with LDC 210-1 via a fiber optic connection of fiber optic connections 240 having a guaranteed amount of reserved uplink bandwidth for the constant bit rate uplink data stream and an amount of reserved downlink bandwidth sufficient for the digitized signals being output by the corresponding DU to be transmitted to the RU. Fiber optic connections 240 can allow for encoded, but not necessarily encrypted, data to be transmitted between an RU and corresponding DU. Since the data remains encoded to be transmitted by or as received from an RU, the data is essentially as secure as the RF signal transmitted between the RU and the UE. Therefore, additional encryption may not be necessary. In other embodiments, an additional layer of encryption between an RU and corresponding DU over the fiber optic connection may be added for increased security. While the embodiments herein are focused on fiber optic connections, other forms of transport for high-bandwidth digital data may additionally or alternatively be used, such as a microwave communication link.

Local data center 210-1 may be geographically separated from the various light base stations 260. In some embodiments, a light BS of light BSs may be located at the same site as LDC 210-1. For example, in an urban environment, light BSs may be scattered throughout a downtown district, with LDC 210-1 and a light BS being located at the same building. LDC 210-1 may host multiple components, including one or more routers, such as router 215, and DU host server system 220. DU host server system 220 may represent one or more computer servers, that include multiple processors and one or more non-transitory processor-readable mediums, on which special-purpose software can be executed. Each of DUs 230 can be a separate instantiation of the same special-purpose software. Therefore, each of RUs 250 has a corresponding instance of a DU in DUs 230. For example, DU 230-1 performed the distributed unit functions for RU 250-1. By sharing underlying hardware of DU host server system 220 across multiple DUs, resources, such as memory and processing resources, can be shared. Therefore, if a particular DU needs additional resources, DU host server system 220 may be able to devote idle resources (such as those not being used by another DU instance) to the instance of the DU in need of the additional resources. A minimum amount of resources may always be devoted to each DU instance. A pool of excess resources may be available for use by a DU instance in need of additional resources.

While each of DUs 230 may be executed on the same underlying hardware, in some embodiments, separate hardware may be used for each of DUs 230. For example, each of DUs 230 can be implemented as special-purpose hardware at LDC 210-1. Fiber optic connections 240 may be connected with DU host server system 220. In some embodiments, fiber optic connections 240 may be connected with router 215, which may route communications as needed to DU host server system 220 and the specific instances of DUs 230. A high bandwidth connection from LDC 210-1 may be connected to a CU and to the 5G core network, which can be co-located at the same facility or hosted elsewhere. In embodiments, multiple DU host server systems may be present at LDC 210-1 to support a greater number of light base stations.

Figure 3:
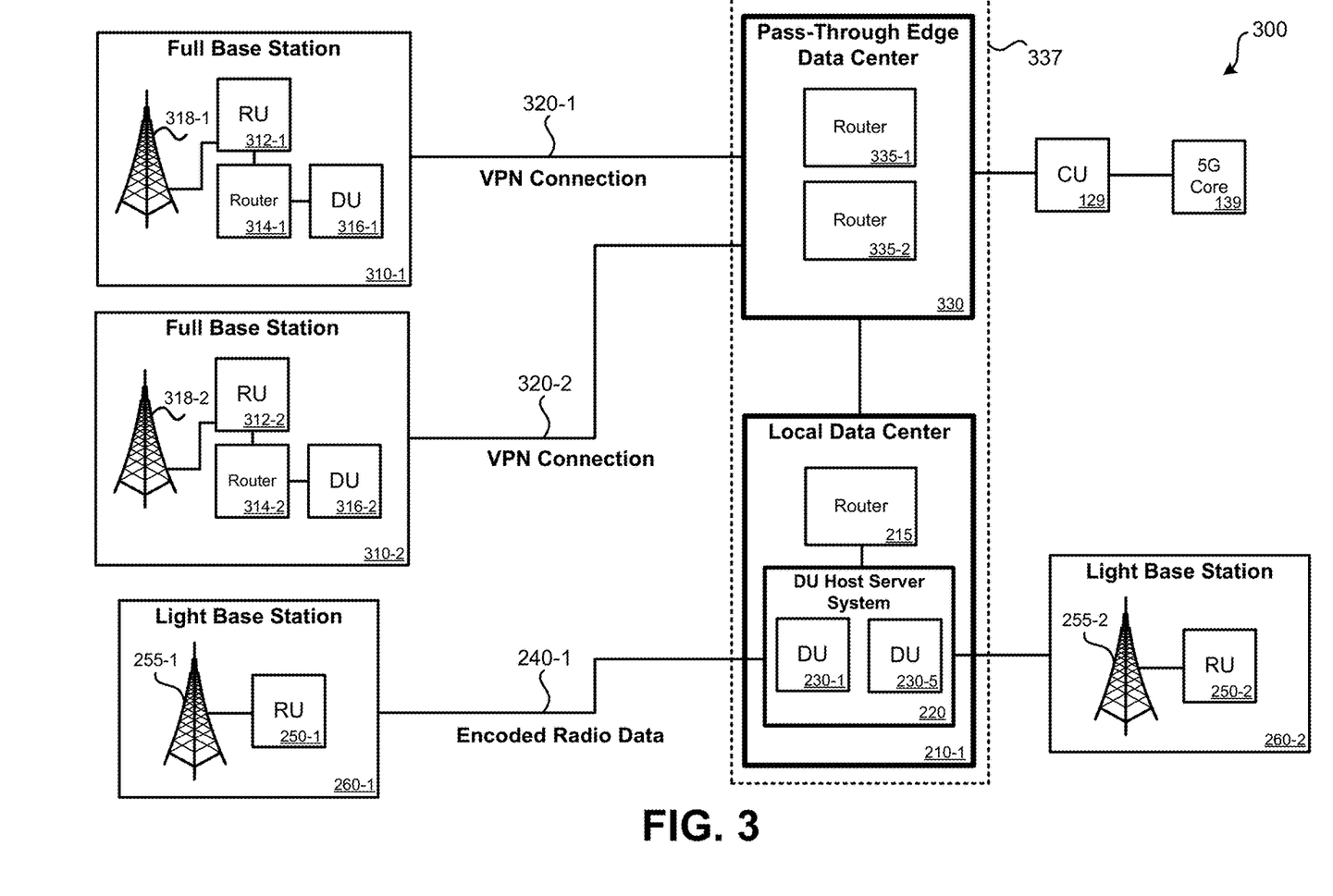
FIG. 3 illustrates an embodiment of a cellular network that includes hybrid use of local and remote DUs.

The light BSs of FIG. 2 and the accompanying LDC with its remotely-hosted DUs can be incorporated as part of a cellular network architecture that also uses "full" base stations. A "full BS" refers to a base station that includes a local DU. FIG. 3 illustrates an embodiment of cellular network system 300 ("system 300") that includes hybrid use of local and remote DUs. System 300 can include: LDC 210-1; fiber optic connections 240; light BSs 260; full BSs 310; VPN connections 320; pass-through edge data center 330 ("P-EDC 330"); CU 129; and 5G core 139.

LDC 210-1 and light BSs 260 may communicate and function as detailed in relation to system 200 of FIG. 2. Additionally, LDC 210-1 can be connected with P-EDC 330. In some embodiments, LDC 210-1 and P-EDC 330 may be co-located in a same data center or are relatively near each other, such as within 250 meters. P-EDC 330 can include multiple routers, such as routers 335, and can serve as a hub for multiple full base stations 310 and one or more LDCs 210. P-EDC 330 may be so named because it primarily handles the routing of data and does not host any RAN or cellular core functions. In a cloud-computing cellular network implementation at least some components, such as CU 129 and functions of 5G core 139, may be hosted in a cloud-computing environment. P-EDC 330 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from P-EDC 330.

Full base stations 310, which include on-site DUs 316, may connect with the cellular network through P-EDC 330. A full base station, such as full base station 310-1, can include: RU 312-1; router 314-1; DU 316-1; and structure 318-1. Router 314-1 may have a connection to a high bandwidth communication link with P-EDC 330. Router 314-1 may route data between DU 316-1 and P-EDC 330 and between DU 316-1 and RU 312-1. In some embodiments, RU 312-1 and one or more antennas are mounted to structure 318-1, while router 314-1 and DU 316-1 are housed at a base of structure 318-1. Full base station 310-2 functions similarly to full base station 310-1. While two full base stations 310 and two light base stations 260 are illustrated in FIG. 3, it should be understood that these numbers of base stations are merely for exemplary purposes; in other embodiments, the number of each type of base station may be greater or fewer.

While encoded radio data is transmitted via the fiber optic connections 240 between light BSs 260 and LDC 210-1, connection 320-1 between full BSs 310 and P-EDC 330 may occur over a fiber network. For example, while the connection between light BS 260-1 and LDC 210-1 can be understood as a dedicated point-to-point communication link on which addressing is not necessary, full BS 310-1 may operate on a fiber network on which addressing is required. Multiprotocol label switching (MPLS) segment routing (SR) may be used to perform routing over a network (e.g., fiber optic network) between full base station 310-1 and P-EDC 330. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 310-1. While MPLS SR can be used for the network connection between full BSs 310 and P-EDC 330, it should be understood that other protocols and non-fiber-based networks can be used for connections 320.

For communications across connection 320-1, since a fiber network that may also be used by other entities is used, a virtual private network (VPN) may be established between DU 316-1 and P-EDC 330. The encryption of this VPN helps ensure the security of the data transmitted over the fiber network.

Since light BSs 260 are relatively close to LDC 210-1, typically in a dense urban environment, use of dedicated point-to-point fiber connection can be relatively straightforward to install or obtain (e.g., from a network provider that has available dark fiber or fiber on which bandwidth can be reserved). However, in a less dense environment, where full BSs 310 can be used, a point-to-point fiber connection may be cost-prohibitive or otherwise unavailable. As such, the fiber network on which MPLS SR is performed and the VPN connection is established can be used instead. Further, the total amount of upstream and/or downstream data from a light BS to an LDC may be significantly greater than the amount of upstream and/or downstream data from a DU of a full base station to P-EDC 337, thus requiring a dedicated fiber optic connection to satisfy the bandwidth requirements of light BSs.

Figure 4:
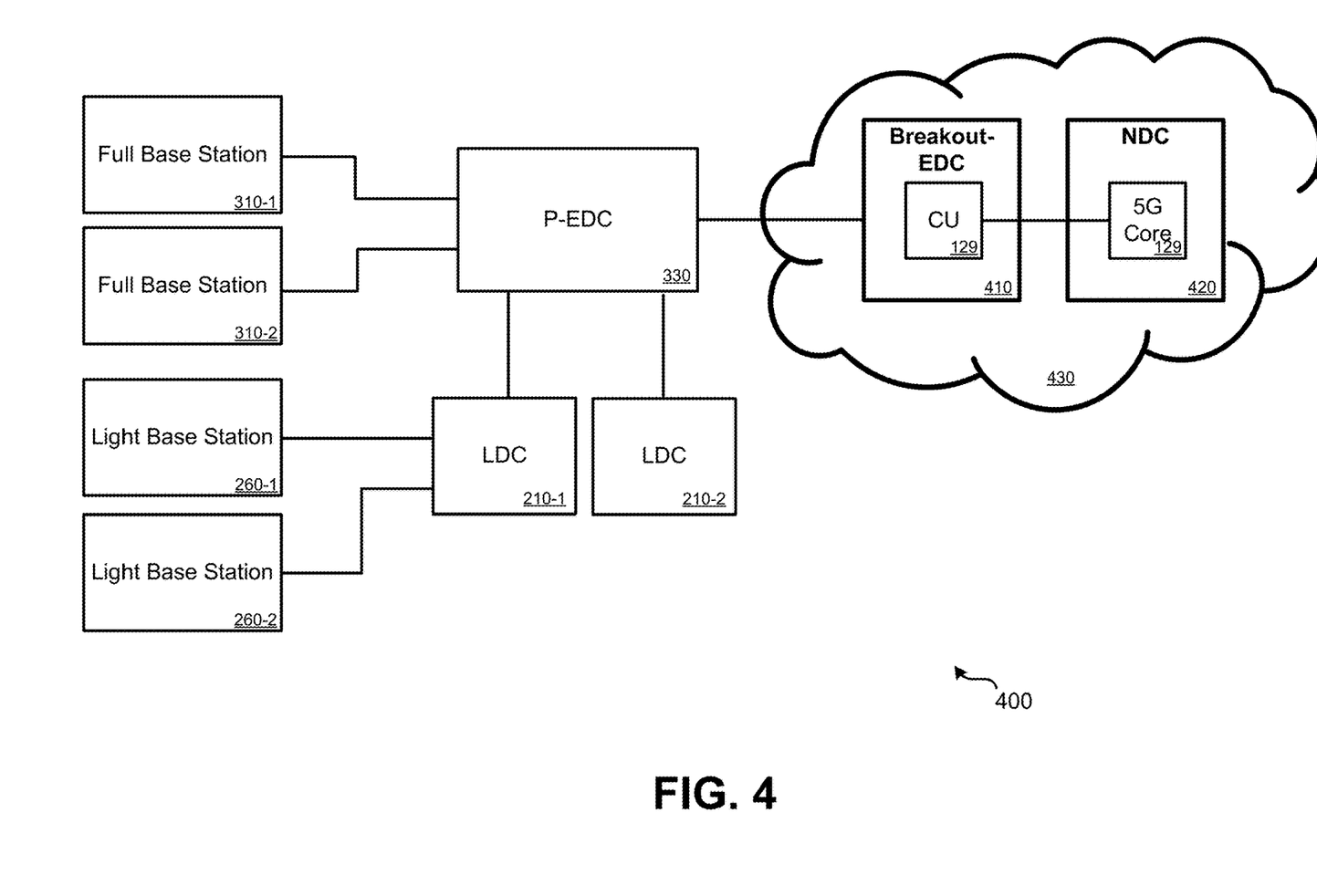
FIG. 4 illustrates another embodiment of a cellular network that includes hybrid use of local and remote DUs.

Further detail is provided in FIG. 4 regarding integration of a P-EDC with a CU hosted in the cloud. FIG. 4 illustrates an embodiment of cellular network system 400 ("system 400") that includes hybrid use of light and full BSs. System 400 can represent an embodiment of system 300 in which some components are hosted on a cloud-computing platform. System 400 can include: LDCs 210; light BSs 260; P-EDC 330; logical breakout edge data center 410 ("B-EDC 410"); logical national data center 420 ("NDC 420"); and cloud computing platform 430.

P-EDC 330 may communicate with multiple LDCs 210. Each of LDCs 210 can host DUs for some number of light BSs. As illustrated, LDC 210-1 hosts DU functionality for two light BSs 260. Such an arrangement is for illustration purposes only; LDC 210-2 can host some number of DUs and LDC 210-1 can host a greater or fewer number of DUs. Likewise, P-EDC 330 may serve to provide routing functions for one, three, or more than three LDCs. Further, some number of full BSs 310 can communicate with P-EDC 330, such as one, three, or more than three.

P-EDC 330 may connect with cloud computing platform 430, for which the underlying physical hardware can be maintained by an entity separate from the cellular network provider. For example, Amazon® Web Services (AWS) can be used as cloud platform 430. Hosted on cloud platform 430 can be logical B-EDC 410 within which CU 129 is hosted. Additionally, hosted on cloud platform 430 can be logical NDC 420, within which 5G core 139 is hosted. In embodiments that involve a cellular network other than a 5G NR cellular network, a different type of cellular network core could be present.

Figure 5:
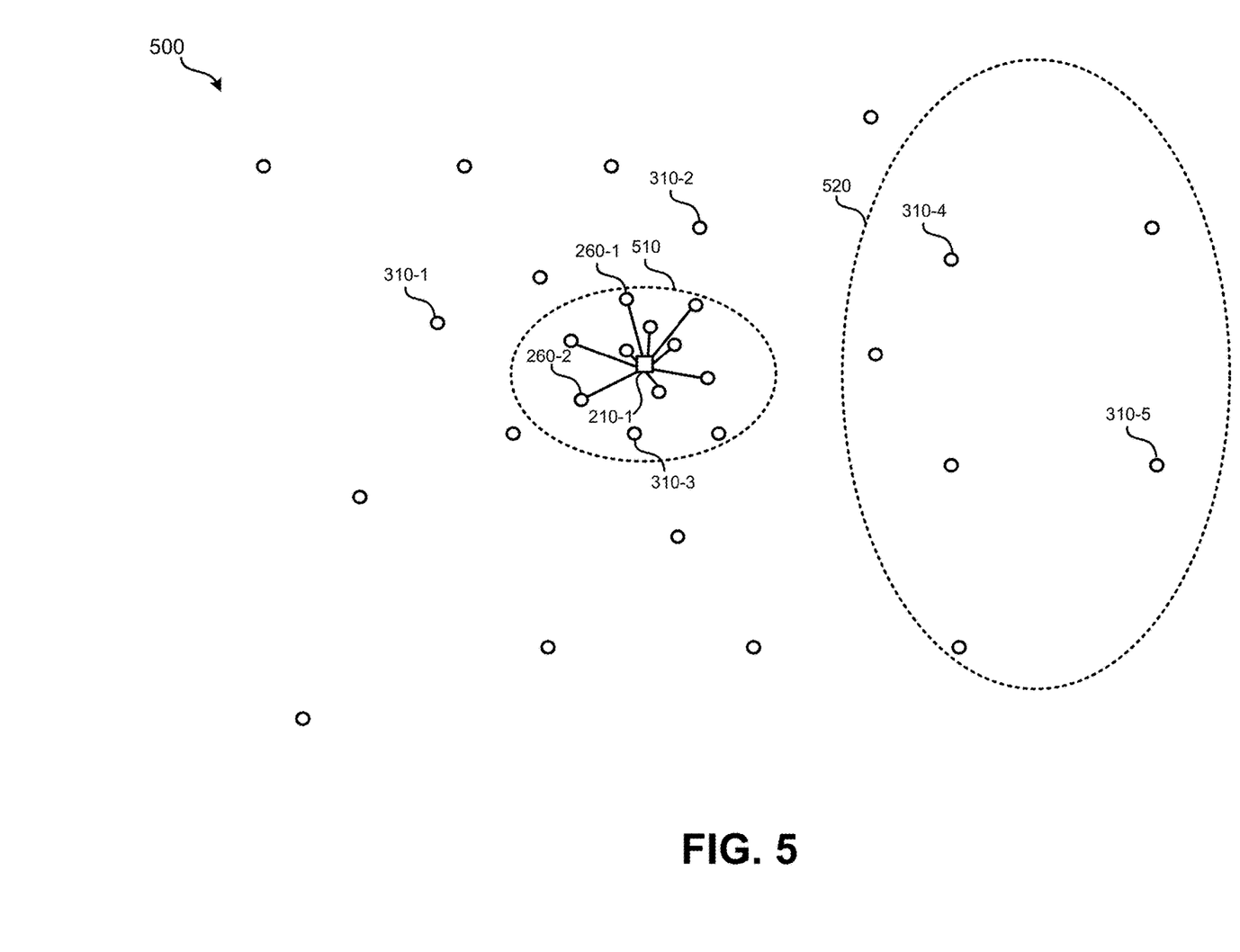
FIG. 5 illustrates an embodiment of the geographic distribution of different types of base stations within a hybrid DU cellular network architecture.

FIG. 5 illustrates an embodiment 500 of the geographic distribution of different types of base stations within a cellular network having a hybrid architecture of local and remote DUs. Geographic region 510 may need a particularly high density of base stations to provide sufficient cellular network service. Within geographic region 510, LDC 210-1 may host instances of DUs for connected light BSs, such as light BS 260-1 and light BS 260-2. Within geographic region 510, in some locations, it may also make sense to use one or more full base stations, such as full BS 310-3. In geographic region 520, which may need a relatively lower density of BSs to provide sufficient cellular network service, only full BSs, such as full BSs 310-4 and 310-5, may be used.

Figure 6:
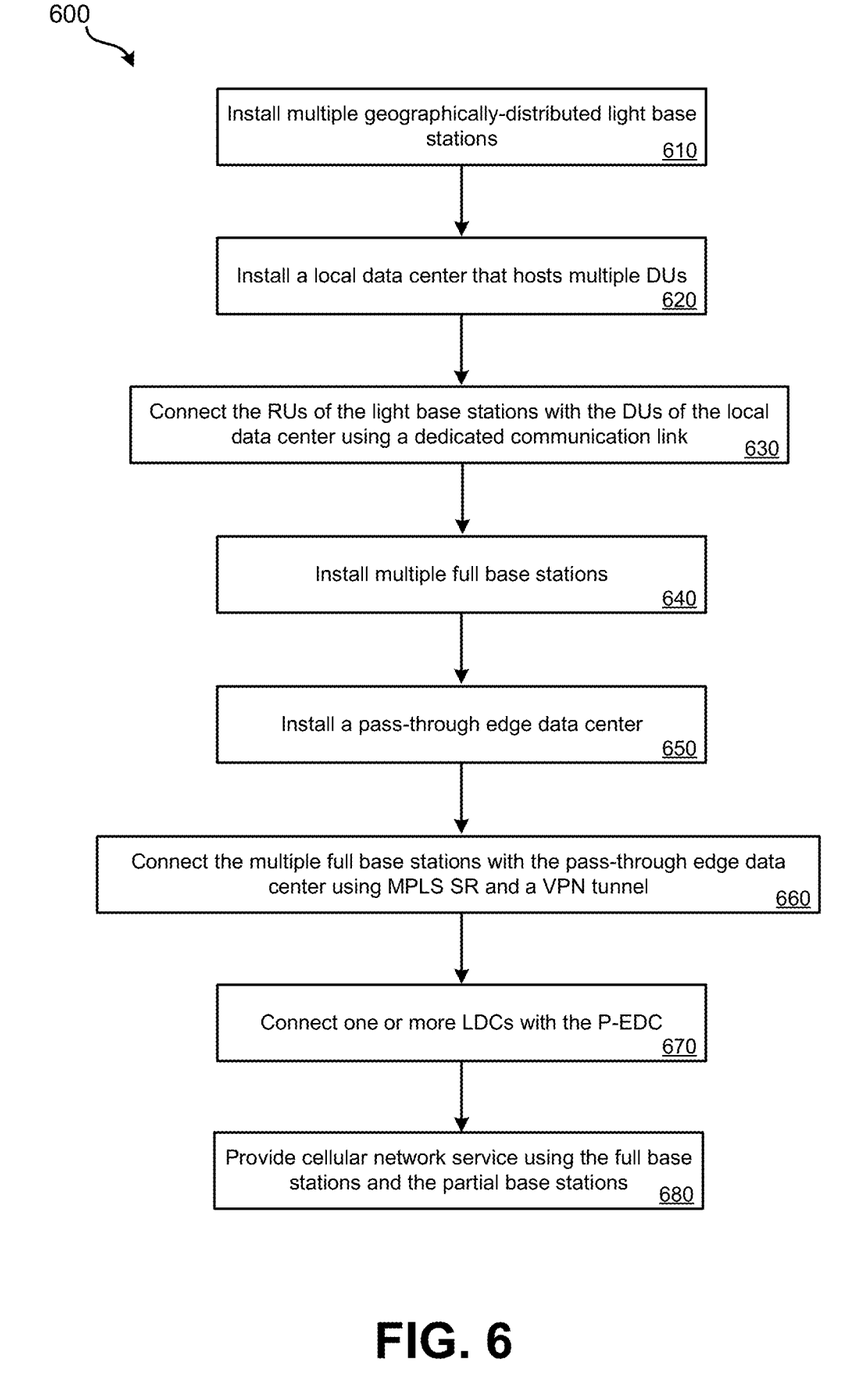
FIG. 6 illustrates an embodiment of a method for creating a cellular network utilizing a hybrid distribution of DUs.

Various methods may be performed using the systems and arrangements of FIGS. 1-5. FIG. 6 illustrates an embodiment of a method 600 for creating a cellular network utilizing a hybrid distribution of DUs. Method 600 can be performed using cellular network systems 100, 200, 300, and 400. At block 610, multiple geographically distributed light BSs may be installed. For example, referring to FIG. 5, these BSs may be installed in a geographic region requiring a high density of BSs to provide sufficient cellular network coverage (e.g., due to obstacles that affect signal propagation, due to the number of users, due to the amount of uplink and/or downlink bandwidth needed). No DU or underlying hardware capable of executing a software-based DU implementation may be installed at any of the light BSs of block 610.

At block 620, an LDC may be installed. The LDC can host general-purpose computing hardware that hosts a DU instantiation for each light BS of block 610. Therefore, if ten light BSs are installed, ten DU instantiations can be executed by the computing hardware of the LDC. At block 630, the RUs of the light BSs are connected with the DUs of the LDC. In some embodiments, at each light BS, a router may be present that communicates with the RU and is connected with a high-speed data connection, such as a fiber connection. A dedicated communication link between each light BS and the LDC may be present. A dedicated communication link can refer to a certain amount of upstream and downstream bandwidth being reserved for communication between the RU and its corresponding DU. The RU may output a constant bitrate stream of data that is to be sent to the DU for processing. Therefore, at least the upstream bandwidth needed remains constant. In some embodiments, a dedicated fiber optic link is present from the light BS to the LDC.

At block 640, one or more full base stations, which include an onsite DU and underlying computer hardware, can be installed. Such full BSs may be installed in geographic regions in which a relatively lower density of cellular network coverage is needed compared to the geographic region in which the light BSs were installed.

At block 650, a P-EDC may be installed. This P-EDC may be installed in physical proximity to a data center of the cloud-computing provider that hosts the CU and cellular network core with which the P-EDC needs to communicate. The P-EDC may have a high-speed connection with the cloud computing platform. Alternatively, if no cloud-computing platform is used, the P-EDC may have a link to the cellular network provider's dedicated hardware that serves as the B-EDC and/or NDC. At block 660, the multiple full BSs may be connected with the P-EDC using a data connection that varies from the data connection used for the light BSs. Over a high-speed network, such as a fiber-based communication network, MPLS SR may be used in concert with a VPN tunnel for security between each full BS and the P-EDC.

At block 670, one or more LDCs, which includes the LDC of block 630, are connected via a communication link with the P-EDC. A direct communication link may be used. In some embodiments, MPLS NR may be used for communication. At block 680, cellular network service can then be provided to UE using the full and light BSs over the geographic regions in which the full and light BSs were installed. Such cellular network service can involve core cellular network functions being provided by functions hosted on a cloud-computing platform in communication with the pass-through edge data center.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cellular network, comprising:
 a plurality of light 5G base stations, wherein:
  each light 5G base station of the plurality of light 5G base stations comprises a radio unit and an antenna; and
  each light 5G base station of the plurality of light 5G base stations does not include a distributed unit; and
 a local data center, comprising a distributed unit host server system, that is communicatively connected with each light 5G base station of the plurality of light 5G base stations, wherein:
  the distributed unit host server system of the local data center hosts an instantiation of a distributed unit for each light 5G base station of the plurality of light 5G base stations; and
  the local data center is geographically remote from the plurality of light 5G base stations;
 a pass-through edge data center (P-EDC), distinct from the local data center, comprising one or more routers, wherein
  the P-EDC is communicatively connected with a full base station and the local data center that is communicatively connected with the plurality of light 5G base stations;
  the P-EDC routes communications from the local data center to a centralized unit (CU); and
  the P-EDC routes communications from the full base station to the CU; and
 the CU, wherein:
  the CU is hosted separately from the P-EDC;
  the CU is hosted on a cloud-computing platform; and
  the CU is communicatively connected with the P-EDC.

2. The cellular network of claim 1, wherein each RU of the plurality of light 5G base stations transmits a continuous bit rate data stream of received signals to the local data center.

3. The cellular network of claim 2, further comprising a plurality of dedicated fiber optic links, wherein each dedicated fiber optic link connects a different light 5G base station of the plurality of light 5G base stations with the local data center.

4. The cellular network of claim 1, further comprising:
 the full base station, comprising: an RU, and a distributed unit, wherein:
  the radio unit and the distributed unit are located on site at the full base station.

5. The cellular network of claim 1, wherein the full base station communicates using multiprotocol label switching (MPLS) segment routing (SR) on a fiber-based network.

6. The cellular network of claim 1, wherein the centralized unit is hosted on the cloud-computing platform as part of a break-out edge data center.

7. The cellular network of claim 1, wherein the full base station further comprises a router that routes communications between the radio unit, the distributed unit, and the P-EDC.

8. A method for creating a cellular network utilizing a hybrid distribution of distributed units (DUs), the method comprising:
  installing a plurality of light base stations distributed in a geographic region, wherein each light base station of the plurality of light base stations comprises a radio unit (RU) but does not include a DU, wherein:
    the plurality of light base stations is part of a 5G New Radio (NR) cellular network;
  installing a local data center that hosts a plurality of DUs, wherein each DU of the plurality of DUs corresponds to a light base station of the plurality of lights base stations;
  installing a pass-through edge data center (P-EDC), distinct from the local data center, comprising one or more routers, wherein:
    the P-EDC is communicatively connected with a full base station;
    the P-EDC routes communications from the full base station to a centralized unit (CU);
    the CU is communicatively connected with the P-EDC; and
    the CU is hosted separately from the P-EDC; and
  connecting the local data center with the P-EDC, wherein the P-EDC routes communications from the local data center to the CU; and
  connecting the RUs of the plurality of light base stations with the DUs of the local data center using dedicated communication links.

9. The method for creating the cellular network utilizing the hybrid distribution of DUs of claim 8, the method further comprising:
  installing a plurality of full base stations, comprising the full base station, where each full base station of the plurality of full base stations comprises a radio unit and a DU.

10. The method for creating the cellular network utilizing the hybrid distribution of DUs of claim 9, wherein multi-protocol label switching (MPLS) segment routing (SR) is used for communication between the P-EDC and each full base station of the plurality of full base stations.

11. The method for creating the cellular network utilizing the hybrid distribution of DUs of claim 9, the method further comprising:
  providing cellular network service to a plurality of user equipment using the plurality of full base stations and the plurality of light base stations.

12. The method for creating the cellular network utilizing the hybrid distribution of DUs of claim 11, further comprising:
  connecting the P-EDC with a cloud computing platform on which a cellular network core is executed.

13. The method for creating the cellular network utilizing the hybrid distribution of DUs of claim 12, wherein the CU is hosted by the cloud computing platform and each of the plurality of DUs and the plurality of full base stations communicate with the CU.

14. The method for creating the cellular network utilizing the hybrid distribution of DUs of claim 8, further comprising:
  transmitting, by each RU of the plurality of light base stations, a continuous bit rate data stream of received signals to the local data center.

15. The method for creating the cellular network utilizing the hybrid distribution of DUs of claim 8, wherein a plurality of dedicated fiber optic links is used to connect the RUs of the plurality of light base stations with the DUs of the local data center.

* * * * *